(12) United States Patent
Trotta

(10) Patent No.: US 9,900,065 B2
(45) Date of Patent: *Feb. 20, 2018

(54) SYSTEM AND METHOD FOR HIGH-SPEED ANALOG BEAMFORMING

(71) Applicant: Infineon Technologies AG, Neubiberg (DE)

(72) Inventor: Saverio Trotta, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/390,324

(22) Filed: Dec. 23, 2016

(65) Prior Publication Data

US 2017/0180018 A1 Jun. 22, 2017

Related U.S. Application Data

(63) Continuation of application No. 14/663,195, filed on Mar. 19, 2015, now Pat. No. 9,531,451.

(51) Int. Cl.
*H04B 1/02* (2006.01)
*H04B 7/0413* (2017.01)
*H04L 27/20* (2006.01)
*H04L 7/033* (2006.01)

(52) U.S. Cl.
CPC ......... *H04B 7/0413* (2013.01); *H04L 7/0331* (2013.01); *H04L 27/2003* (2013.01)

(58) Field of Classification Search
CPC .. H04B 7/0413; H04L 7/0331; H04L 27/2003
USPC ............................................................ 455/101
See application file for complete search history.

(56) References Cited

U.S. PATENT DOCUMENTS

| 5,016,202 | A | 5/1991 | Seibel et al. |
| 5,023,571 | A | 6/1991 | Fullmer et al. |
| 5,028,886 | A | 7/1991 | Seibel et al. |
| 8,666,341 | B2 | 3/2014 | Marsolais et al. |
| 9,531,451 | B2 * | 12/2016 | Trotta .................. H04B 7/0413 |
| 2012/0121043 | A1 | 5/2012 | Wambacq |
| 2015/0195027 | A1 | 7/2015 | Jung et al. |

FOREIGN PATENT DOCUMENTS

JP H03124122 A 5/1991
KR 20120042648 A 5/2012

* cited by examiner

*Primary Examiner* — Sanh Phu
(74) *Attorney, Agent, or Firm* — Slater Matsil, LLP

(57) ABSTRACT

In accordance with an embodiment, a Radio Frequency (RF) front end system includes a first chip that includes a frequency multiplier coupled to a first input terminal. The frequency multiplier is configured to form an upscaled reference signal by upscaling in frequency an oscillating reference signal received at the first input terminal. The first chip also includes a Voltage-Controlled Oscillator (VCO) configured to provide a first oscillating VCO signal, and an oscillator switch coupled to the VCO and the frequency multiplier. The oscillator switch is configured to select a Local Oscillator (LO) signal from between the first oscillating VCO signal and the upscaled reference signal. The first chip also includes a first phase shifter coupled to an output of the oscillator switch, and a modulator having an input coupled to an output of the first phase shifter.

20 Claims, 7 Drawing Sheets

SYSTEM AND METHOD FOR HIGH-SPEED ANALOG BEAMFORMING

CROSS-REFERENCE TO RELATED APPLICATIONS

This application is a continuation of U.S. application Ser. No. 14/663,195, filed on Mar. 19, 2015, entitled "System and Method for High-Speed Analog Beamforming," which application is hereby incorporated herein by reference in its entirety.

TECHNICAL FIELD

The present invention relates generally to a system and method for Radio Frequency (RF) beamforming, and, in particular embodiments, to a system and method for high-speed analog beamforming.

BACKGROUND

RF phased-array beamforming systems with long range and high throughput are desired for many applications such as communications backhauling and high-speed routing in Wireless Gigabit (WiGig) or other consumer wireless systems. Many applications favor low-power solutions operating in the millimeter-wave range—in particular the 57 to 86 GigaHertz (GHz) range—that are scalable Multiple Input Multiple Output (MIMO) systems with flexible transmit and receive partitioning for different customers. Other desirable features include ease of production testing, high inter-channel isolation, and robust thermal and mechanical behavior.

Nevertheless, designing such RF beamforming systems presents a number of challenges. If digital beamforming is to be used, the baseband processing to support the large channel bandwidth (e.g., 250 MHz to 2 GHz) would require prohibitively high power consumption by high-speed Analog-to-Digital Converters (ADCs) and Digital-to-Analog Converters (DACs). If analog beamforming is to be used, the long ranges (e.g., above 200 meters for backhauling) and large modulation constellations (above QAM16) would present severe requirements for Signal-to-Noise Ratio (SNR) and jitter. These noise and jitter requirements would be heightened by the non-linearities introduced by phase-shifting at high power and high frequency and would further constrain the design's flexibility and scalability.

SUMMARY OF THE INVENTION

In accordance with an embodiment of the present invention, a method for phased array beamforming is provided. The method includes selecting a first operating mode for at least one chip from among a transmit mode and a receive mode. The at least one chip includes a first phase shifter and a modulator having an input coupled to an output of the first phase shifter. The method also includes selecting a second operating mode for the at least one chip from among a master mode and a slave mode and obtaining, by the at least one chip, a first oscillating signal. The method also includes generating, by the at least one chip, a target RF transmit signal when the at least one chip is in the transmit mode. The generating the target RF transmit signal includes phase-shifting, by the first phase shifter, the first oscillating signal in accordance with a first phase shift to form a first phase-shifted signal. The method also includes determining, by the modulator, a modulated RF signal in accordance with the first phase-shifted signal.

In accordance with another embodiment of the present invention, an RF front end system is also provided. The system includes a first chip that includes a frequency multiplier coupled to a first input terminal. The frequency multiplier is configured to form an upscaled reference signal by upscaling in frequency an oscillating reference signal received at the first input terminal. The first chip also includes a Voltage-Controlled Oscillator (VCO) configured to provide a first oscillating VCO signal, and an oscillator switch coupled to the VCO and the frequency multiplier. The oscillator switch is configured to select a Local Oscillator (LO) signal from between the first oscillating VCO signal and the upscaled reference signal. The first chip also includes a first phase shifter coupled to an output of the oscillator switch, and a modulator having an input coupled to an output of the first phase shifter.

In accordance with another embodiment of the present invention, a system for LO signal generation is also provided. The system includes a first chip that includes a VCO circuit having multiple VCOs. The VCO circuit is configured to receive a first VCO tuning signal and a VCO enable signal and to provide a VCO output signal in accordance with the first VCO tuning signal and the VCO enable signal. The first chip also includes at least one first oscillator switch coupled to the VCO circuit. The at least one first oscillator switch is configured to receive an oscillating external reference signal and to select from among the external reference signal and the VCO output signal. The first chip also includes a first phase shifter coupled to an output of the at least one first oscillator switch.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method for low-noise analog beamforming for use in an RF transceiver system such as a millimeter-wave MIMO system supporting flexible transmit and receive partitioning of phased-array channels. Further embodiments may be applied to other RF transmitter/receiver systems that require low noise to support high-speed, extended range applications such as, for example, communications backhauling, WiGig, etc.

Figure 1:
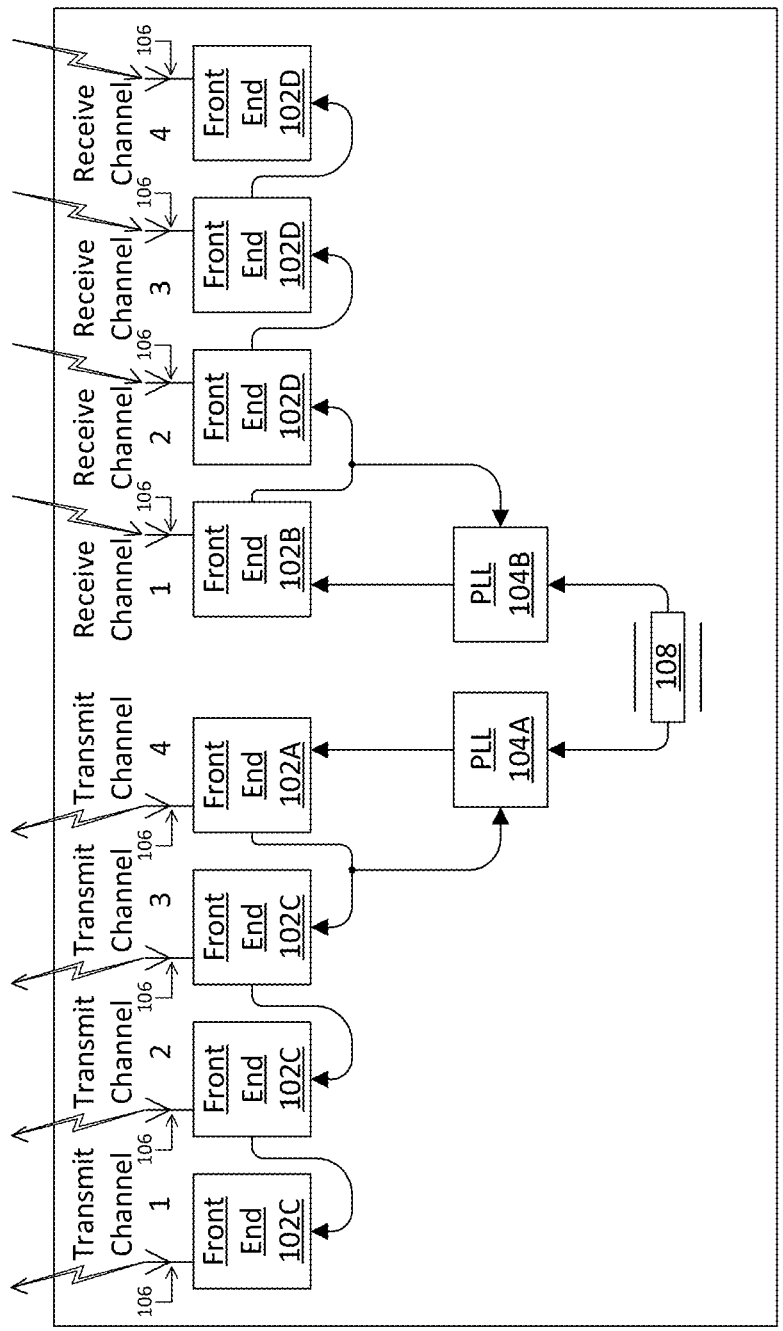
FIG. 1 is a block diagram illustrating an RF phased-array beamforming system mounted on Printed Circuit Board (PCB) in accordance with embodiments of the present invention.

FIG. 1 illustrates a phased-array RF beamforming system mounted on PCB that includes multiple single-channel front end chips 102A-102D. In some embodiments, the front end chips 102A-102D are capable of operating at millimeter wavelengths such as V-band and E-band wavelengths. In the embodiment of FIG. 1, the front end chips 102A-102D have flexible modes of operation allowing them to be synchronized as either a master or a slave and to either transmit or receive at their external antennas 106. In other embodiments, the front end chips are Antenna-in-Package (AiP) devices that do not use an external antenna 106.

Referring again to FIG. 1, front end chips 102A and 102C are in transmit mode and form a transmit group, while front end chips 102B and 102D are in receive mode and form a receive group. The mode of operation of the chips 102A-102D can be selected using a standard interface, for example, a serial peripheral interface (SPI). Master-mode front end chips 102A and 102B are identical in structure to each other and to slave-mode front end chips 102C and 102D. In some embodiments, this identical front end structure supports testing and qualification of only a single chip. The master front end chips 102A and 102B include a VCO that is a master VCO generating an LO signal and a signal that is downscaled in frequency relative to the LO signal to form a reference signal for use in synchronizing the slave chips. In some embodiments, providing a master reference signal having a lower frequency than the LO reference signal allows simplified PCB layout.

In the transmit group, the LO signal generated by the master transmit VCO is also used to generate an RF transmit signal of the master transmit front end chip 102A. The downscaled reference signal of this front end chip 102A is used to generate RF signals to be transmitted by the slave transmit front end chips 102C. In the receive group, the LO signal generated by the master receive VCO is used to demodulate an RF signal received by the master receive front end chip 102B, and the downscaled reference signal of this front end chip 102B is used to demodulate RF signals received by the slave receive front end chips 102D.

Each slave front end chip 102C and 102D applies a phase shift to the master reference signals to provide analog beamforming. The amount of the phase shift applied by each slave front end 102C determines the beam axis of a transmit radiation pattern that is transmitted by the transmit group. The amount of the phase shift applied by each slave front end 102D determines the beam axis of an expected radiation pattern that is to be received by the receive group.

Two phase lock loops (PLLs) 104A and 104B that are connected to the master front end chips 102A and 102B compare the master reference signals to the output of a reference oscillator 108 to generate tuning signals for the master VCOs. The reference oscillator 108 may be, for example, a crystal oscillator or any other stable electronic oscillator. In the embodiment of FIG. 1, the phased array uses Frequency Division Duplexing (FDD), the transmit PLL 104A tunes the front ends 102A and 102C to transmit signals on one frequency (e.g., 70 GHz), and the receive PLL 104B tunes the front end chips 102B and 102D to receive signals on another frequency (e.g., 80 GHz). In other embodiments, the phased array uses Time Division Duplexing (TDD), a single PLL tunes transmitting and receiving front ends to the same frequency, and the front ends alternate transmitting and receiving in different time slots.

Figure 2:
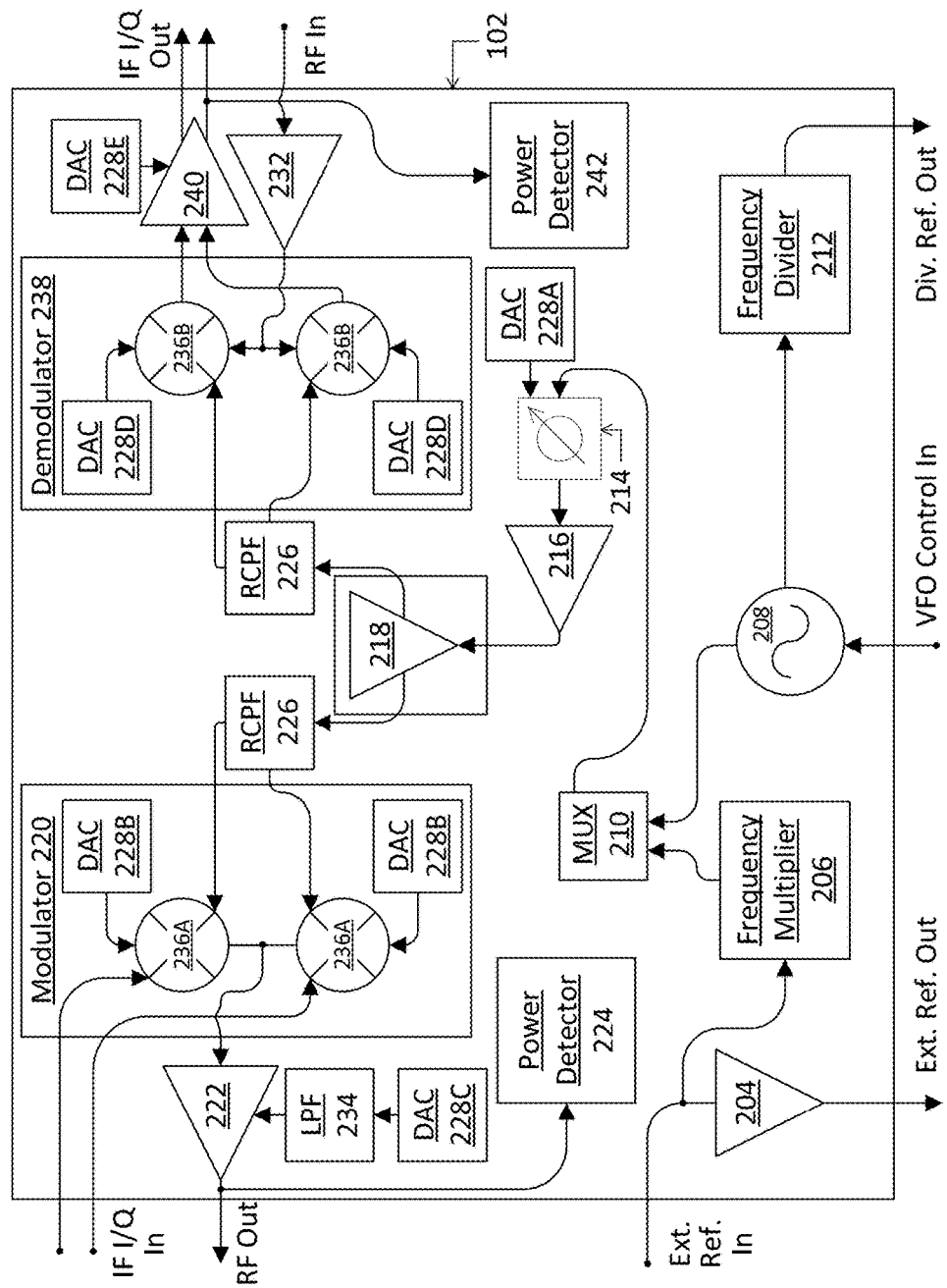
FIG. 2 is a block diagram illustrating an RF front end chip that may be used in the RF beamforming system in accordance with embodiments of the present invention.

FIG. 2 illustrates an embodiment RF front end chip 102 that may be used in the RF beamforming system. The front end chip 102 has modes of operation allowing it to be synchronized as either a master or as a slave front end and to either transmit or receive at an external antenna. In other embodiments, the front end chip is an AiP device that does not use an external antenna.

For use when the front end chip 102 is in slave mode, the chip 102 has an input terminal that can receive an external reference signal. The external reference signal is provided by an external oscillator or by a master front end chip. A buffer amplifier 204 can receive the external reference signal from the input terminal and provide it as an external reference output signal of the chip 102. A frequency multiplier 206 also receives the external reference signal from the input terminal. The frequency multiplier 206 upscales the external reference signal in frequency by, for example, a factor of four.

For use when the front end chip 102 is in master mode, the chip 102 also includes a VCO 208 that provides an oscillating signal. The chip 102 receives a tuning signal for tuning the frequency of this oscillating VCO signal. In some embodiments, this VCO 208 is a push-push VCO having providing a first oscillating signal having a second harmonic frequency that is twice the fundamental frequency of the VCO 208. In a first example, the VCO fundamental frequency range may have a tunable range of 17.75 to 21.5 GHz and the first oscillating signal may have a corresponding frequency range of 35.5 to 43 GHz. In a second example, the VCO fundamental frequency has a tunable range of, for example, 28.5 to 32 GHz, and the first oscillating signal has a corresponding V-band range of 57 to 64 GHz. In other embodiments, multiple VCOs may be used that each have a different fundamental frequency range corresponding to a different band of interest. Using multiple VCOs allows the range of the VCO tuning signal to be reduced to improve VCO phase noise and associated production yield in producing the chip 102. In still other embodiments, the first oscillating signal is at the fundamental VCO frequency.

In embodiments using a push-push VCO, the VCO 208 also generates a second oscillating signal at the tuned fundamental frequency that is half the frequency of the first oscillating signal. A frequency divider 212 downscales in frequency the fundamental-frequency oscillating signal to form a downscaled reference output signal of the chip 102. This downscaled reference output signal can be used to synchronize slave front ends, and when the chip 102 is in slave mode it can also be used for production self-testing by connecting the downscaled reference output to the external reference input of the chip 102.

A multiplexer 210 is used as an oscillator switch to configure the chip when master mode or slave mode is selected via the SPI. The multiplexer 210 selects one of the first VCO oscillating signal (in master mode) and the upscaled reference signal (in slave mode) to provide an LO signal for the chip 102.

A phase shifter 214 applies a phase shift to the LO signal that is output from the multiplexer 210. The amount of the phase shift determines the beam axis of either a transmit radiation pattern that is transmitted by the phased array (when the chip 102 is in transmit mode) or of an expected radiation pattern that is to be received by the phased array (when the chip 102 is in receive mode). A DAC 228A connected to the phase shifter 214 receives a digital phase shift signal that contains a digital representation of the amount of the phase shift. The DAC 228A converts the digital phase shift signal to an analog phase shift signal, which controls the amount of phase shift that is applied by the phase shifter 214.

A buffer amplifier 216 provides an impedance isolation and an optional amplification to the phase-shifted LO signal and then provides the phase-shifted LO signal to a power splitter 218. In some embodiments, the buffer amplifier 216 also acts as a frequency doubler. For example, when receiving a phase-shifted LO signal with a frequency in the range of 35.5 to 43 GHz, the buffer amplifier 216 doubles the frequency to an E-band frequency of 71 to 86 GHz before providing the phase-shifted LO signal to the power splitter 218. In an alternative embodiment, the doubler/buffer 216 is positioned prior to the phase shifter 214 and doubles or buffers the LO signal prior to the phase shift being applied.

The power splitter 218 then splits the phase-shifted LO signal for use by a transmit chain and a receive chain of the chip 102. In some embodiments, the power splitter 218 includes a respective active balun and buffer at each of the two splitter outputs.

Each of the outputs of the power splitter 218 is coupled to a respective Resistor-Capacitor Polyphase Filter (RCPF) 226 of the transmit chain and the receive chain. Each RCPF 226 receives the phase-shifted LO signal and provides two output signals: the phase-shifted LO signal (referred to in this disclosure as the LO sine signal) and a second signal that is orthogonal to the phase-shifted LO signal and is equivalent to the phase-shifted LO signal delayed by ninety degrees (referred to in this disclosure as the LO cosine signal). In some embodiments, for example in some embodiments using TDD, a distinct receive phase shifter and transmit phase shifter are coupled to the outputs of each RCPF 228 and provide a separate phase shift for each of the front end's transmit chain and receive chain.

For use when the chip 102 is in transmit mode, the transmit chain includes a modulator 220, a voltage-gated amplifier (VGA) 222, and a power detector 224. The modulator 220 can determine a modulated RF signal by up-mixing a received intermediate frequency (IF) signal with the phase-shifted LO signal. The modulator performs a Single Sideband (SSB) up-conversion using an SSB up-mixer having two up-mixing circuits. These two up-mixing circuits up-mix the real (I) and imaginary (Q) component signals of a complex IF signal received at one or more input terminals of the chip 102. The two up-mixing circuits up-mix the IF I/Q component signals with the LO sine and cosine signals. Each up-mixing circuit includes a respective DAC 228B that receives a digital calibration signal and converts it to an analog calibration signal. Each up-mixing circuit also includes a respective frequency mixer 236A. The respective analog calibration signal is used to calibrate each frequency mixer 236A as it up-mixes one of the I/Q IF component signals with one of the LO sine/cosine signals. In some embodiments, pairs of amplifiers may amplify the outputs of the RCPF 226 and/or the frequency mixers 236A.

The VGA 222 receives the modulated RF signal from the modulator 220 and provides an RF output of the chip 102. The VGA 222 is controlled by a DAC 228C that receives a digital VGA tuning signal and converts it to an analog VGA tuning signal. A low-pass filter 234 then acts as an integrator to smooth the analog VGA tuning signal, and the smoothed VGA tuning signal controls the amount that the VGA 222 amplifies the modulator output. An external capacitor can be used to set the slew rate of the VGA 222. A power detector 224 (e.g., a diode-based power detector) monitors the RF output signal to aid in tuning the amplification level of the VGA 222. In some embodiments, the output of the modulator 220 is also monitored by a second power detector in the transmit chain that is coupled to a broadband amplifier providing an AC power detector output of the chip 102; a multiplexer or other switch may also switch the output of the two transmit power detectors and provide the switched output to an operational amplifier that in turn provides a DC power detector output of the chip 102. In some embodiments, a temperature sensor may also be provided on the chip 102 to generate a temperature output signal of the chip 102. In some embodiments, a power amplifier (PA) further amplifies the output of the VGA 222 to provide the RF output signal of the chip 102.

For use when the chip is in receive mode, the receive chain includes a Low-Noise Amplifier (LNA) 232, a demodulator 238, an IF output amplifier 240, and an IF power detector 242. The LNA 232 amplifies an RF signal received at an input terminal of the chip 102 and provides this amplified RF signal to the demodulator 238. The demodulator 238 performs an SSB down-conversion of the received RF signal using an SSB down-mixer having two down-mixing circuits. These two down-mixing circuits down-mix the received RF signal with each of the receive chain's LO sine signal and LO cosine signal. Each down-mixing circuit includes a respective DAC 228D that receives a digital mixer tuning signal and converts it to an analog mixer tuning signal for tuning, for example, the second order intermodulation intercept (IP2), of a respective frequency mixer 236B of the down-mixing circuit. Each frequency mixer 236B down-mixes the RF receive signal with one of either the LO sine signal or the LO cosine signal to form a respective component IF receive signal.

The component IF receive signals are amplified by the IF output amplifier 240 to provide component IF output signals of the chip 102. The level of amplification provided by the IF output amplifier 240 is controlled by a DAC 228E that receives a digital amplifier tuning signal and converts it to an analog amplifier tuning signal.

Figure 3:
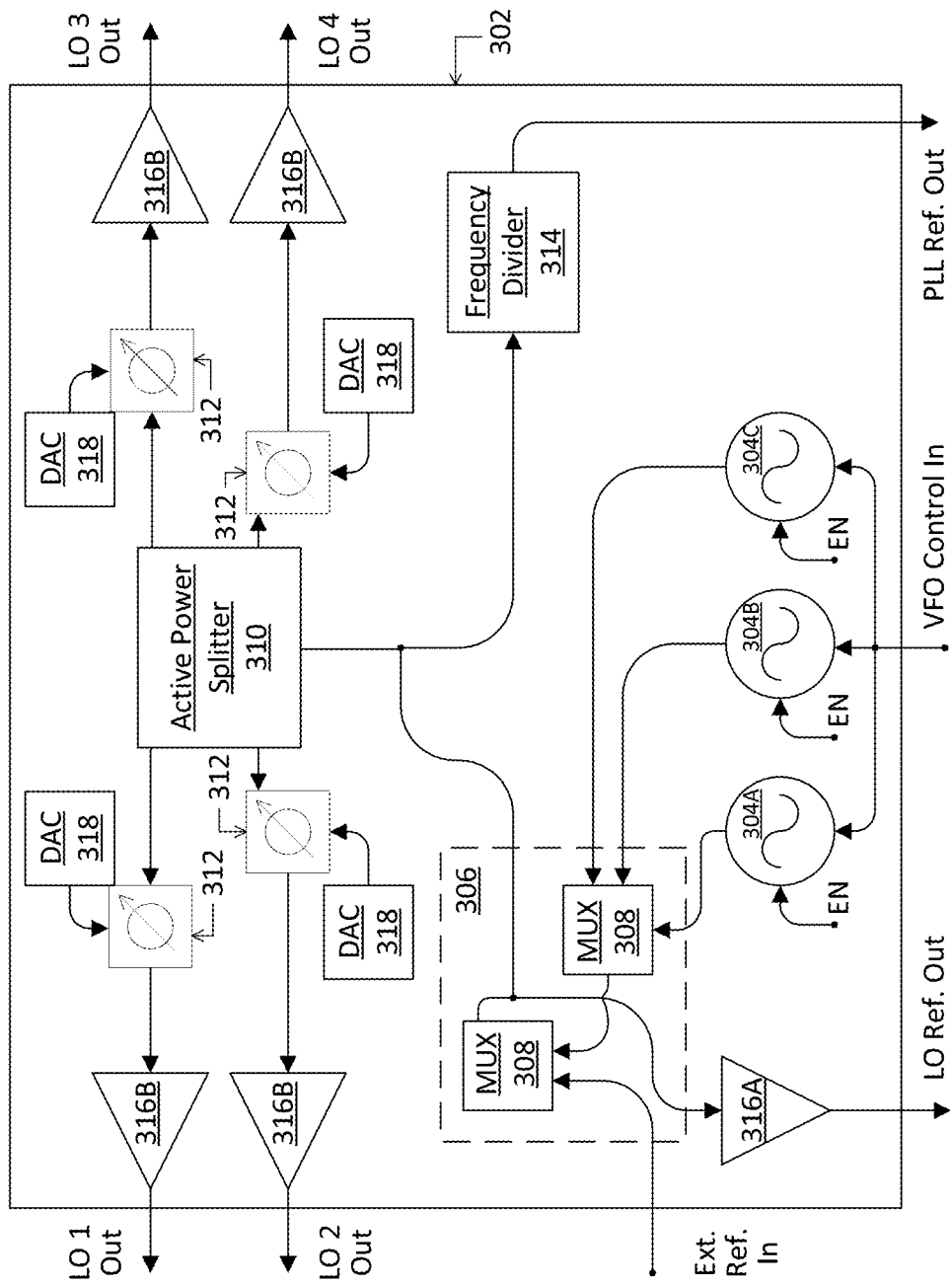
FIG. 3 is a block diagram illustrating an LO chip dedicated for generating multiple phase-shifted LO signals for use by the front end chips in accordance with embodiments of the present invention.

Referring now to FIG. 3, a different beamforming component is shown that is a dedicated LO chip 302 for generating multiple phase-shifted LO signals for use by one or more front end chips 102. The dedicated LO chip 302 allows the phase-shifting to occur at a relatively lower frequency, for example, the frequency of the LO distribution network. An SPI or other standard interface of the LO chip 302 can be used to select operation in either a master mode or slave mode.

For use in master mode, the dedicated LO chip 302 includes a VCO circuit that includes multiple (e.g., three or more) VCOs 304A-304C, one of which may be enabled by a received enable signal. The VCO circuit also receives a VCO tuning signal that is used to control the output of the enabled VCO. Each of the VCOs 304A-304C may have a different output frequency range corresponding to a different band of interest so that the range of the VCO tuning signal may be reduced. For example, VCO 304A may output a signal having a frequency in a VCO fundamental frequency range of 14.25 to 16.5 GHz, VCO 304B may output a signal having a frequency in a VCO fundamental frequency range of 17.75 to 19 GHz, and VCO 304C may output a signal having a frequency in a VCO fundamental frequency range of 20.25 to 21.5 GHz.

The outputs of these multiple VCO outputs are connected to an LO switching circuit 306 that includes two multiplexers 308 acting as oscillator switches. For use in slave mode, the LO switching circuit 306 also receives an oscillating external reference signal. The LO switching circuit 306 selects an LO signal from the external reference signal or the output signal of the enabled VCO, depending on whether the chip is in slave mode or master mode, respectively.

The LO switching circuit provides the LO signal to a frequency divider 314, an active power splitter 310, and a buffer amplifier 316A. The frequency divider 314 downscales the LO signal in frequency to provide a phase lock loop (PLL) reference output signal of the LO chip 302. In some embodiments, a chain of multiple frequency dividers with selectable downscaling can be used to provide the PLL reference output. The buffer amplifier 316A buffers the LO signal, and in some embodiments, amplifies the LO signal to provide an LO reference output of the LO chip 302. This LO reference output may be used to synchronize other identical LO chips that are configured in slave mode.

The active power splitter 310 splits the LO signal and provides it to multiple phase shifters 312, which is each coupled to a respective buffer amplifier 316B that provides a respective phase-shifted LO output signal of the LO chip 302. Each of these multiple phase-shifted LO outputs (e.g., $2^N$ phase-shifted LO output channels) may be used to synchronize a different front end chip 102. Each phase shifter 312 is controlled by a corresponding DAC 318 that receives a digital phase shift signal and converts it to an analog phase shift signal.

In an alternative embodiment in which the phase shifters 312 are implemented as D-type flip flops, push-push VCOs may be used as the VCOs 304A-304C and may be configured to output a frequency that is twice the fundamental frequency. Another respective D flip-flop may then be connected between the active power splitter 310 and each D flip-flop phase shifter to halve the VCO output signal in frequency (to obtain the fundamental frequency) and to generate both an LO sine signal and an LO cosine signal for use by each phase shifter 312 to generate a respective single phase-shifted LO signal of each phase shifter 312.

Figure 4A:
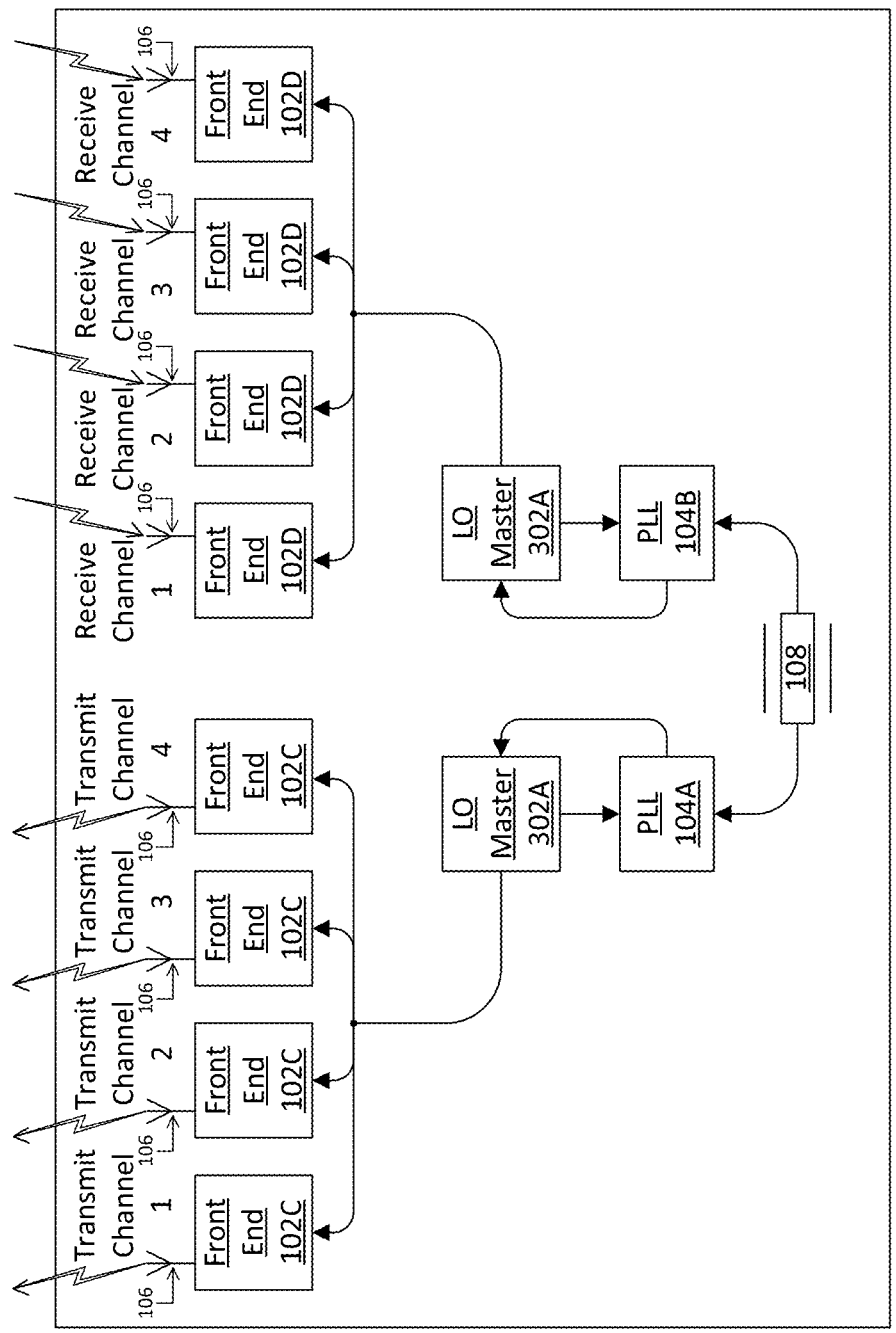
FIG. 4A and FIG. 4B illustrate a phased array that uses multiple instances of both the front end chip and the dedicated LO chip.
Figure 4B:
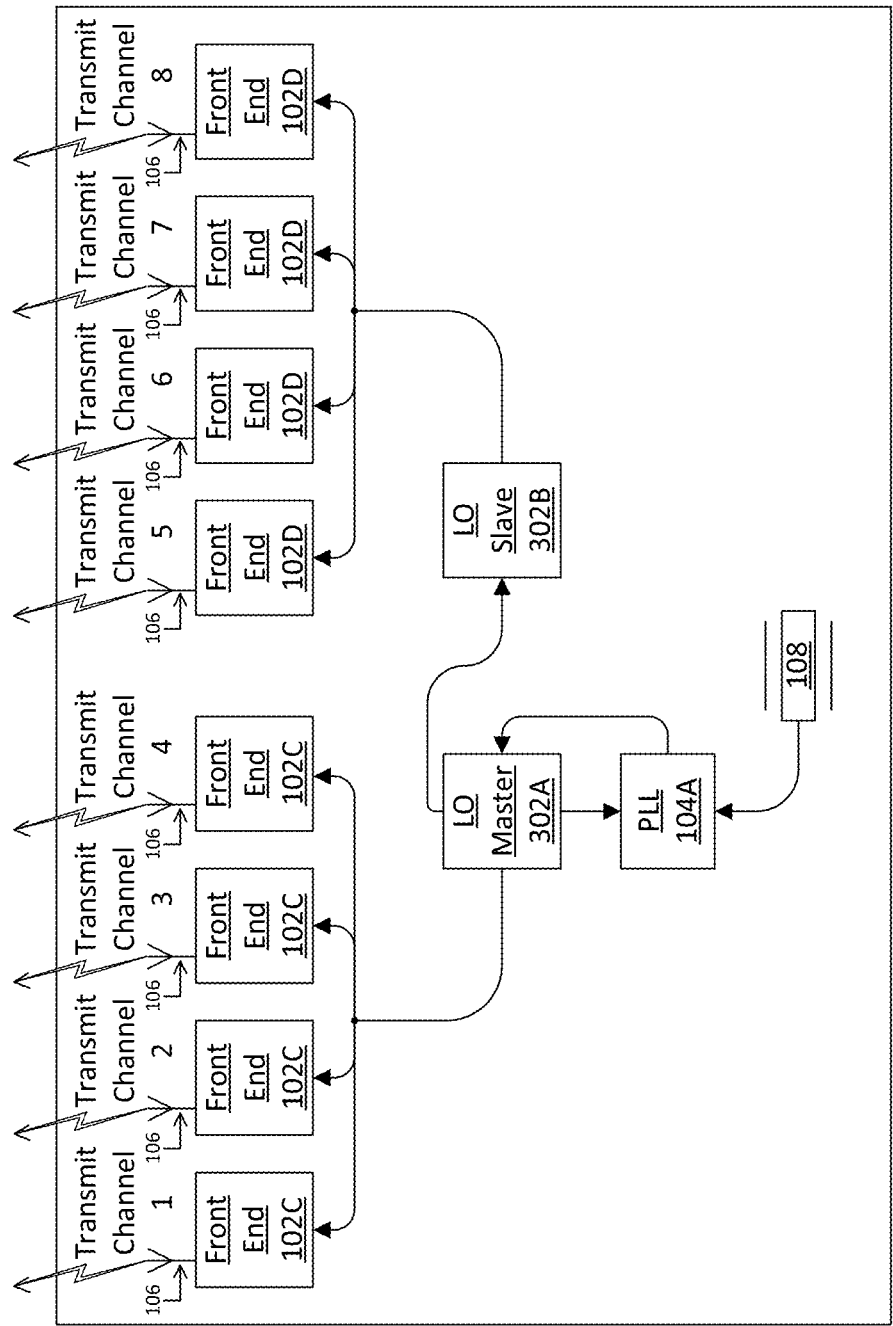

FIG. 4A and FIG. 4B illustrate a phased array that uses multiple instances of both the front end chip 102 and the LO chip 302. FIG. 4A shows a phased array that uses LO chips operating in master-mode to provide phase-shifted LO signals to transmit-mode and receive-mode front ends. FIG. 4B shows a phased array that uses LO chips in a master-slave configuration to provide phase-shifted LO outputs to only transmit-mode front ends.

Referring now to FIG. 4A, the front end chips 102C and 102D are structurally identical and the master-mode LO chips 302A are also structurally identical, which in some embodiments allows testing and qualification to be performed for only two chips. In some embodiments, using dedicated LO chips increases greater current consumption but provides the benefit of allowing phase-shifting at a relatively lower frequency.

The front end chips 102C-D are all configured in slave mode and are divided into a transmit group that is configured in transmit mode and a receive group that is configured in receive mode. In the transmit group, each front end 102C modulates a transmit IF signal using one of the phase-shifted LO outputs provided by an LO chip 302A that has been configured in master mode. In the receive group, each slave front end chip 102D demodulates a received RF signal using one of the phase-shifted LO outputs provided by a second master LO chip 302A.

The two master LO chips 302A provide their PLL reference outputs to PLLs 104A and 104B. These PLLs 104A and 104B compare the PLL reference outputs to the output of a reference oscillator 108 to determine the VCO tuning signals of the master LO chips 302A. In the embodiment of FIG. 1, the phased array uses FDD, the transmit PLL 104A tunes the transmit group to transmit signals on one frequency (e.g., 70 GHz), and the receive PLL 104B tunes the receive group to receive signals on another frequency (e.g., 80 GHz). In other embodiments, the phased array uses TDD, a single PLL tunes the transmit and receive groups to the same frequency, and the front ends 102C-102D alternate transmitting and receiving in different time slots.

FIG. 4B shows a phased array that has only front end chips 102C that are transmit-configured and slave-configured and that uses structurally identical LO chips 302A and 302B in a master-slave configuration. The oscillator switches of the master-mode LO chip 302A provide an LO reference output to the oscillator switches of the slave-mode LO chip 302B to synchronize the slave LO chip 302B. Front end chips 102C connected to the LO chips 302A and 302B synchronize their RF transmit signals using the phase-shifted LO outputs of the LO chips 302A and 302B. In the embodiment of FIG. 4B, the phased array uses FDD and a single PLL 104 tunes the LO chips 302A and 302B to a single frequency (e.g., 70 GHz) using the output of a reference oscillator 108.

Figure 5:
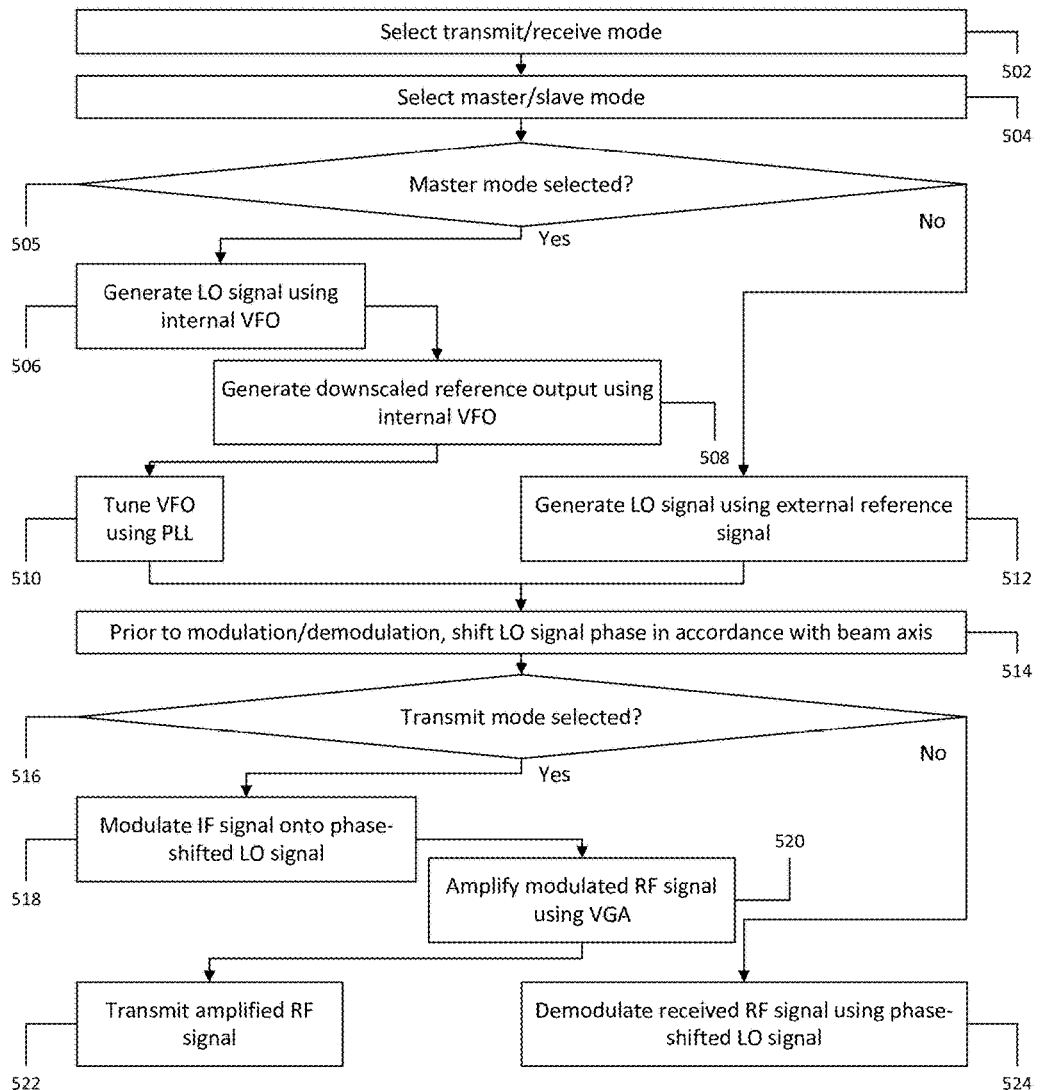
FIG. 5 is a flow diagram illustrating a method for transmitting and receiving using RF beamforming components in accordance with embodiments of the present invention.

FIG. 5 is a flow diagram illustrating an embodiment method for transmitting and receiving using a front end chip and optionally an LO chip in an RF beamforming system. At 502, a first operating mode of the front end chip is selected from among a transmit mode or receive mode. At 504, a second operating mode of either the front end chip or an LO chip is selected from among a master or slave mode. At 505, a flow decision is made based on whether the master mode or the slave mode has been selected.

If the master mode is selected as the second operating mode, then step 506, 508, and 510 are performed. At 506, the front end chip or LO chip generates an LO signal using an internal VCO. In embodiments that use a push-push VCO, the LO signal has a frequency that is twice the fundamental frequency of the VCO. In other embodiments, the LO signal is at the fundamental frequency. At 508, the front end chip or LO chip generates a downscaled reference output signal using the internal VCO. The VCO generates an oscillating signal that has the fundamental frequency of the VCO, which in embodiments that use a push-push VCO is a second oscillating VCO signal having half the frequency of the LO signal. The LO chip or front end chip then downscales in frequency this fundamental-frequency VCO signal to form the downscaled reference signal. At 510, a PLL tunes the VCO using the downscaled reference signal.

Otherwise, if the front end chip or LO chip is in slave mode (i.e., is not in master mode), flow is directed from 505 to 512, where the LO signal is generated using an external reference signal received by the LO chip or front end. In a first embodiment, this LO signal is generated by upscaling the external reference signal. In a second embodiment, this LO signal is the external reference signal.

At 514, the phase of the LO signal is shifted in accordance with a desired beam axis of a transmit radiation pattern (in transmit mode) or of an expected receive radiation pattern (in receive mode). This phase shift is applied prior to modulation or demodulation. At 516, a flow decision is made based on whether the transmit mode or the receive mode has been selected for the front end chip.

If the transmit mode has been selected, then steps 518, 520, and 522 are performed. At 518, the front end chip modulates an IF signal with the phase-shifted LO signal to form a modulated RF signal. At 520, the front end chip then amplifies the modulated RF signal using a VGA. At 522, the front end chip transmits the amplified RF signal.

Otherwise, if the front end is in receive mode (i.e., is not in transmit mode), flow is directed from 516 to 524, where the front end chip receives an RF signal. The front end chip demodulates the received RF signal using the phase-shifted LO signal to form a received IF signal.

Figure 6:
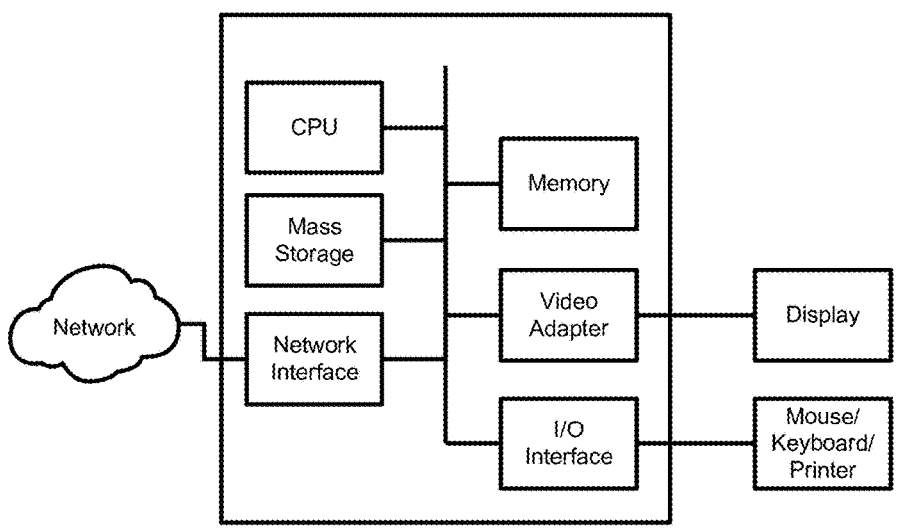
FIG. 6 is a block diagram of a processing system that may be used for implementing some of the devices and methods disclosed herein in accordance with embodiments of the present invention.

FIG. 6 shows a block diagram of a processing system that may be used for implementing some of the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. In an embodiment, the processing system comprises a computer workstation. The processing system may comprise a processing unit equipped with one or more input/output devices, such as a speaker, microphone, mouse, touchscreen, keypad, keyboard, printer, display, and the like. The processing unit may include a CPU, memory, a mass storage device, a video adapter, and an I/O interface connected to a bus. In an embodiment, multiple processing units in a single processing system or in multiple processing systems may form a distributed processing pool or distributed editing pool.

The bus may be one or more of any type of several bus architectures including a memory bus or memory controller, a peripheral bus, video bus, or the like. The CPU may comprise any type of electronic data processor. The memory may comprise any type of system memory such as random access memory (RAM), static RAM (SRAM), dynamic RAM (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like. The network interface may be configured to have various connection-specific virtual or physical ports communicatively coupled to one or more of these remote devices.

Illustrative embodiments of the present invention have the advantage of providing low noise, scalability, flexible partitioning, high mechanical and thermal stability, simplified production testing, high channel-to-channel isolation, low power consumption, low cost, and simplified thermal management. An embodiment system may use, for example, single channel front end chips to provide simplified production testing, high channel-to-channel isolation of both RF and IF channels, and simplified thermal management due to reduced power density. In some embodiments, the use of satellite chips for RF front ends allows them to be placed in close proximity to one or more external antennas or antenna launchers to provide low power loss and high SNR. Embodiments of these satellite chips may be, for example, embedded Wafer Level Ball Grid Array (eWLB) chips that have a small package size to provide high mechanical stability and a redundant number of balls to allow operation after over 1,000 hours of temperature cycling. In other embodiments, the front end chips are AiP devices that can be assembled on low cost PCB (e.g., FR-4) since they do not use an external antenna and thus no do not require any high frequency RF path on the PCB. In some embodiments for use in consumer applications, requirements on temperature cycling are further relaxed to allow the use of low-cost PCB.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:
1. A method comprising:
selecting an operating mode for at least one chip from among a master mode and a slave mode;
obtaining, by the at least one chip, a first oscillating signal, wherein
when the selected operating mode is the master mode, the obtaining the first oscillating signal comprises receiving a first voltage-controlled oscillator (VCO) tuning signal, and generating, by a VCO comprised in the at least one chip, the first oscillating signal in accordance with the first VCO tuning signal, and
when the selected operating mode is the slave mode, the obtaining the first oscillating signal comprises receiving an external reference signal at a first input terminal of the at least one chip, and upscaling the external reference signal to provide the first oscillating signal; and
generating, by the at least one chip, a target radio frequency (RF) transmit signal, wherein the generating the target RF transmit signal comprises:
phase-shifting, by a first phase shifter, the first oscillating signal in accordance with a first phase shift to form a first phase-shifted signal, and
generating, by the at least one chip, the target RF transmit signal based on the first phase-shifted signal.

2. The method of claim 1,
further comprising selecting the master mode as the operating mode of the at least one chip.

3. The method of claim 2, further comprising:
generating, by the VCO, a second oscillating signal having a frequency that is half a frequency of the first oscillating signal;
downscaling the second oscillating signal in frequency to determine a first downscaled reference signal; and
determining, by a phase lock loop (PLL) circuit, the first VCO tuning signal in accordance with the first downscaled reference signal.

4. The method of claim 1, wherein the generating the target RF signal comprises performing a single sideband (SSB) up-conversion of a complex intermediate frequency (IF) transmit signal in accordance with the first phase-shifted signal.

5. The method of claim 1, wherein the phase-shifting the first oscillating signal further comprises:
receiving a first digital representation of the first phase shift;
converting the first digital representation into a first analog phase shift signal; and
phase-shifting the first oscillating signal in accordance with the first analog phase shift signal to form the first phase-shifted signal.

6. The method of claim 1, wherein the generating the target RF transmit signal further comprises:
receiving a digital voltage-gated amplifier (VGA) tuning signal;
converting the digital VGA tuning signal into an analog VGA tuning signal;
smoothing the analog VGA tuning signal to form a smoothed VGA tuning signal;
modulating the first phase-shifted signal to form a modulated RF signal; and
amplifying, by a VGA comprised in the at least one chip, the modulated RF signal in accordance with the smoothed VGA tuning signal to form an amplified RF signal.

7. The method of claim 1, further comprising:
receiving, by the at least one chip, an RF receive signal; and
demodulating, by a demodulator having an input coupled to an output of the first phase shifter, the RF receive signal in accordance with the first phase-shifted signal to form a demodulated complex intermediate frequency (IF) signal,
wherein the demodulator is comprised in the at least one chip.

8. The method of claim 7, wherein the demodulating comprises performing a single sideband (SSB) down-conversion of the RF receive signal in accordance with the first phase-shifted signal.

9. The method of claim 1, further comprising:
selecting the slave mode as the operating mode of the at least one chip;
selecting the master mode as an operating mode of a second chip, wherein the second chip is coupled to the at least one chip and comprises a structure that is identical to a first chip of the at least one chip;
generating, by a master voltage-controlled oscillator (VCO) comprised in the second chip, a master VCO signal;
generating, by the second chip in accordance with the master VCO signal, a master RF transmit signal comprised in a transmit radiation pattern having a beam axis determined in accordance with the first phase shift, wherein the first phase shift comprises a phase shift that is relative to the master RF transmit signal, and the target RF transmit signal is also comprised in the transmit radiation pattern; and
generating, by the second chip, the external reference signal, the external reference signal having a frequency that is a fixed ratio less than a frequency of the master VCO signal.

10. A radio frequency (RF) front end system comprising a first chip, wherein the first chip comprises:
a frequency multiplier coupled to a first input terminal, wherein the frequency multiplier is configured to form an upscaled reference signal by upscaling in frequency an oscillating reference signal received at the first input terminal,
a voltage-controlled oscillator (VCO) configured to provide a first oscillating VCO signal;
an oscillator switch coupled to the VCO and the frequency multiplier, wherein the oscillator switch is configured to select a Local Oscillator (LO) signal from between the first oscillating VCO signal and the upscaled reference signal; and
a first phase shifter coupled to an output of the oscillator switch.

11. The system of claim 10, wherein the first chip further comprises a buffer amplifier coupled to the first input terminal, wherein the buffer amplifier is configured to provide a reference signal output of the first chip in accordance with the oscillating reference signal.

12. The system of claim 10, wherein
the VCO is further configured to provide the first oscillating VCO signal and a second oscillating VCO signal in accordance with a VCO tuning signal received at a second input terminal of the first chip,
the second oscillating VCO signal has a frequency that is half a frequency of the first oscillating VCO signal; and
the first chip further comprises a frequency divider coupled to the VCO and configured to downscale the second oscillating VCO signal in frequency to form a downscaled reference output signal of the first chip.

13. The system of claim 12, further comprising a master chip coupled to the first chip;
wherein the master chip comprises a structure that is identical to the first chip; and
wherein the oscillating reference signal of the first chip comprises a downscaled reference output signal generated by the master chip.

14. The system of claim 13, further comprising a phase lock loop (PLL) coupled to the master chip, wherein the PLL is configured to generate a VCO tuning signal of the master chip in accordance with the downscaled reference output signal of the master chip.

15. The system of claim 10, further comprising a single sideband (SSB) up-mixer having an input coupled to an output of the first phase shifter.

16. The system of claim 15, wherein the first chip further comprises:
a demodulator comprising an SSB down-mixer having an input coupled to an RF input terminal of the first chip;
a first Resistor-Capacitor Polyphase Filter (RCPF) having an input coupled to an output of the first phase shifter and having an output coupled to an input of the SSB down-mixer;

a second RCPF having an input coupled to the output of the first phase shifter and having an output coupled to an input of the SSB up-mixer,
  wherein the first RCPF and the second RCPF are each configured to:
    receive a first phase-shifted LO signal of the first chip;
    delay the first phase-shifted LO signal to form a respective delayed signal; and
    output the first phase-shifted LO signal and the respective delayed signal; and
a first DAC having an output coupled to an input of the first phase shifter,
  wherein the first DAC is configured to receive a first digital phase shift signal and to provide a first analog phase shift signal to the first phase shifter.

17. The system of claim 15, wherein the first chip further comprises:
a voltage-gated amplifier (VGA) coupled to an output of the SSB up-mixer;
a second DAC configured to receive a digital VGA tuning signal; and
a low-pass filter electrically coupled between the second DAC and the VGA.

18. A system for Local Oscillator (LO) signal generation comprising a first chip, wherein the first chip comprises:
a voltage-controlled oscillator (VCO) circuit, wherein the VCO circuit is configured to receive a first VCO tuning signal and a VCO enable signal and to provide a VCO output signal in accordance with the first VCO tuning signal and the VCO enable signal;
at least one first oscillator switch coupled to the VCO circuit, wherein the at least one first oscillator switch is configured to receive an oscillating external reference signal and to select from among the external reference signal and the VCO output signal; and
a first phase shifter coupled to an output of the at least one first oscillator switch.

19. The system of claim 18, further comprising a second chip, wherein the second chip comprises a first modulator comprising an input coupled to an output of the first phase shifter.

20. The system of claim 19, wherein the first chip further comprises:
a second phase shifter; and
a signal splitter comprising:
  an input coupled to the output of the at least one first oscillator switch,
  a first splitter output coupled to an input of the first phase shifter, and
  a second splitter output coupled to an input of the second phase shifter.

* * * * *